United States Patent [19]
Hardin, Jr.

[11] 3,945,116
[45] Mar. 23, 1976

[54] ROTARY SHEAR WITH IMPROVED CUTTING ASSEMBLY

[76] Inventor: John Ralph Hardin, Jr., Claremont Road, R.D. 1, Bernardsville, N.J. 07924

[22] Filed: Jan. 23, 1975

[21] Appl. No.: 538,457

Related U.S. Application Data

[63] Continuation-in-part of Ser. No. 413,533, Nov. 7, 1973, abandoned.

[52] U.S. Cl. .................... 30/206; 30/207; 30/240; 56/17.5
[51] Int. Cl.² .................... B26B 15/00; A01G 3/06
[58] Field of Search ............ 30/206, 207, 240, 347, 30/DIG. 1, 205, 264, 210, 221, 222, 276; 56/17.5, 255

[56] References Cited
UNITED STATES PATENTS

| | | | |
|---|---|---|---|
| 2,134,609 | 10/1938 | Hay | 30/264 X |
| 2,618,851 | 11/1952 | Sundstrand | 30/207 |
| 2,867,040 | 1/1959 | Mertesdorf | 30/240 |
| 3,403,440 | 10/1968 | Omori | 30/DIG. 1 |
| 3,774,379 | 11/1973 | Mizobata | 56/17.5 |

*Primary Examiner*—Al Lawrence Smith
*Assistant Examiner*—J. C. Peters

[57] ABSTRACT

A portable hand-held shear for cutting grass and the like comprising a housing enclosing an electric motor and forming a handle. The motor includes an output rotary shaft which, through a gear train, drives a rotary blade. A stationary bed knife assembly connected to the housing cooperates with the rotary blade in scissor-like fashion to cut grass.

An improved cutting assembly is described in which the rotary cutting blade member, of particular design and positioned in a floating relationship above the stationary bed knife assembly, is inclined into engagement with the cutting teeth projecting from the stationary bed knife assembly, also of particular design, in such a manner to improve the performance of the shear. The improved cutting assembly further includes a rotary hub drive member which cooperates with the shear housing and the bed knife to eliminate clogging and partially overlaps the bed knife assembly's cutting teeth to further improve the performance of the shear.

11 Claims, 10 Drawing Figures

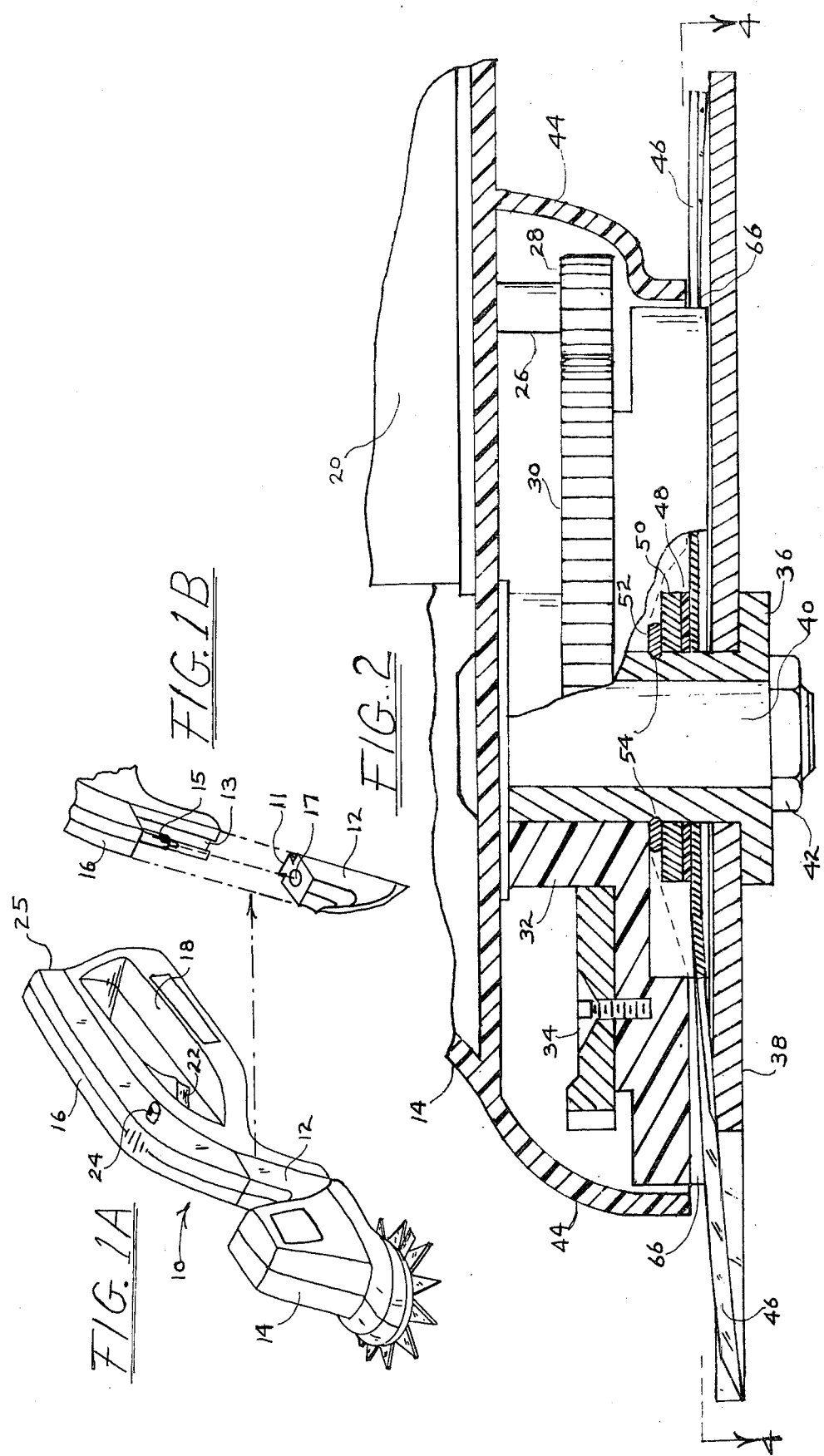

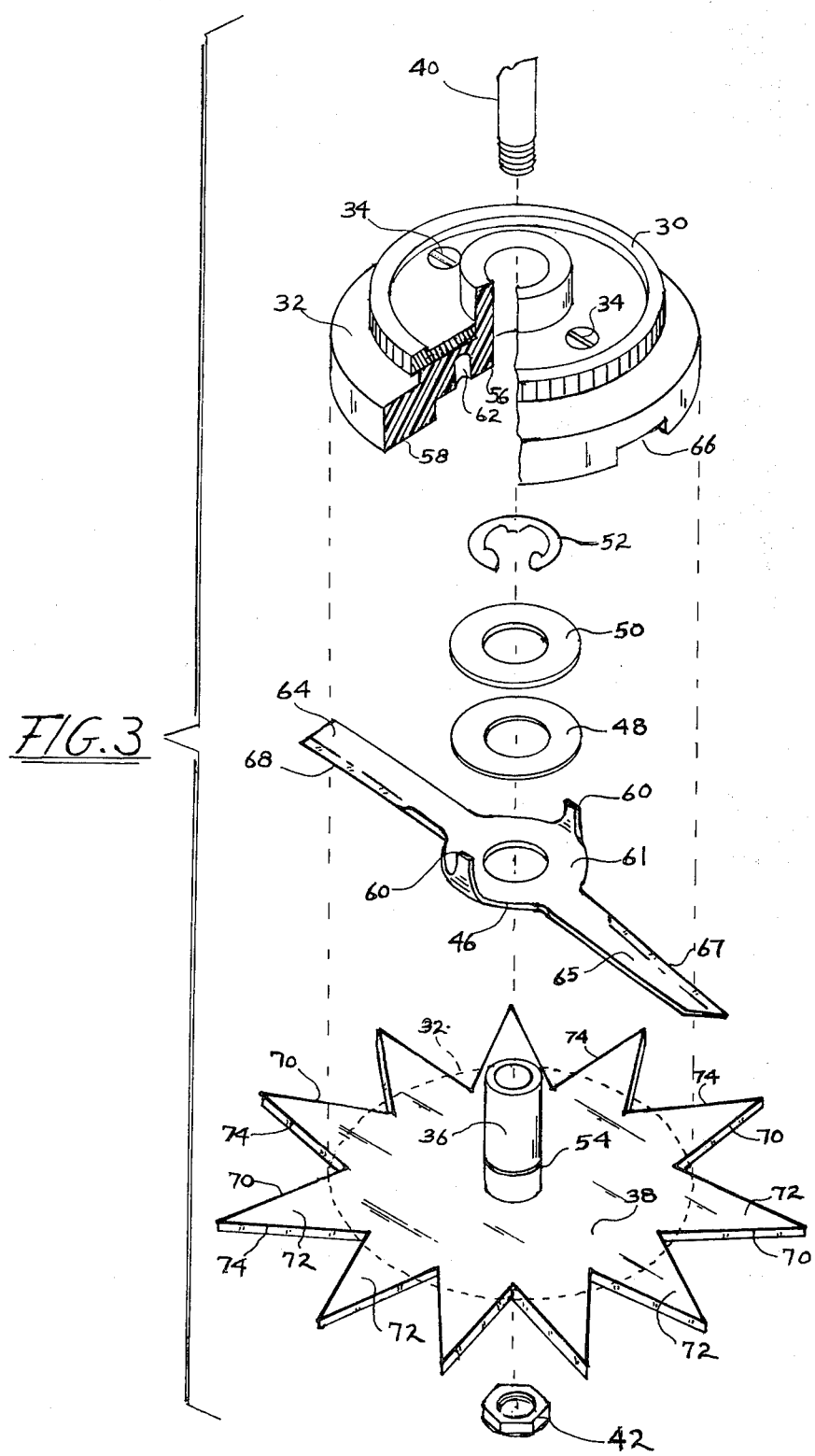

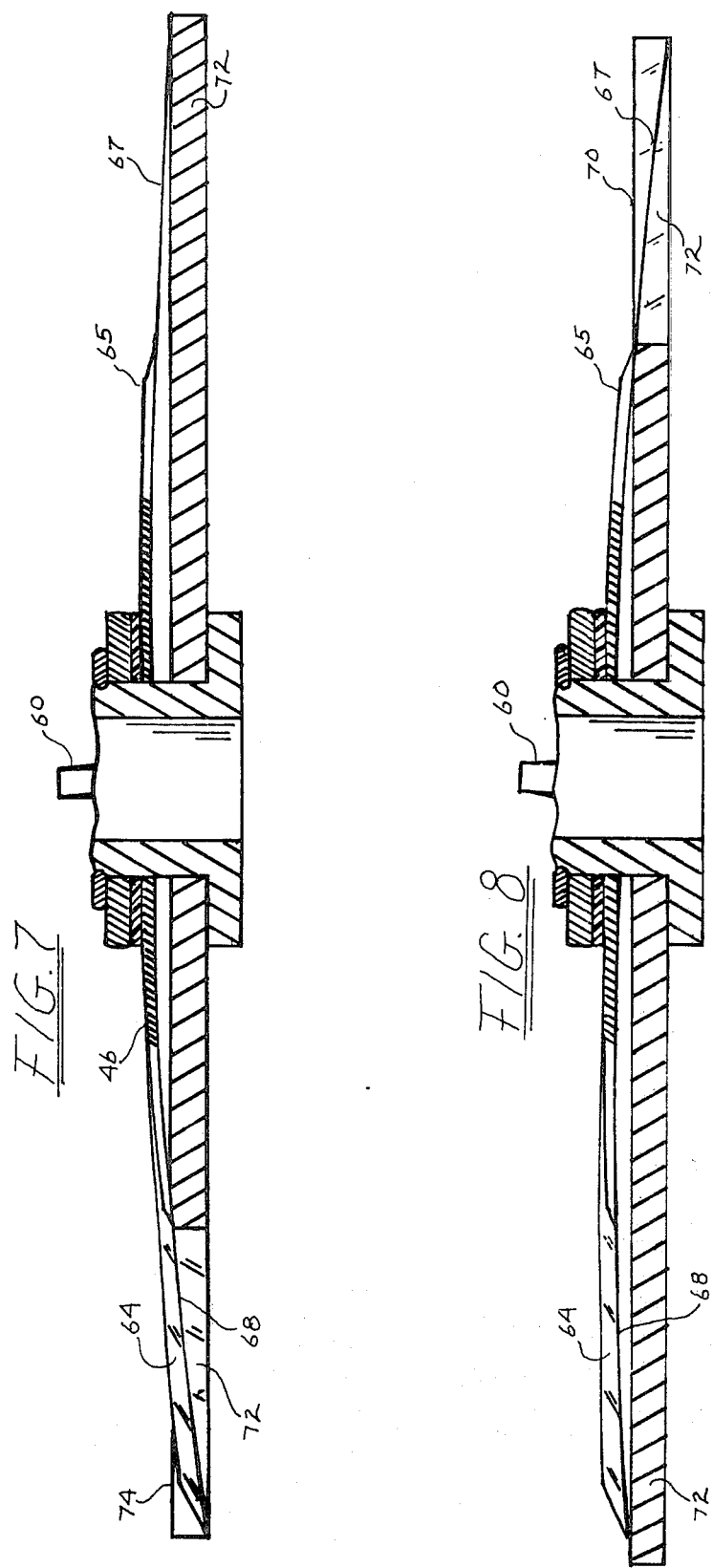

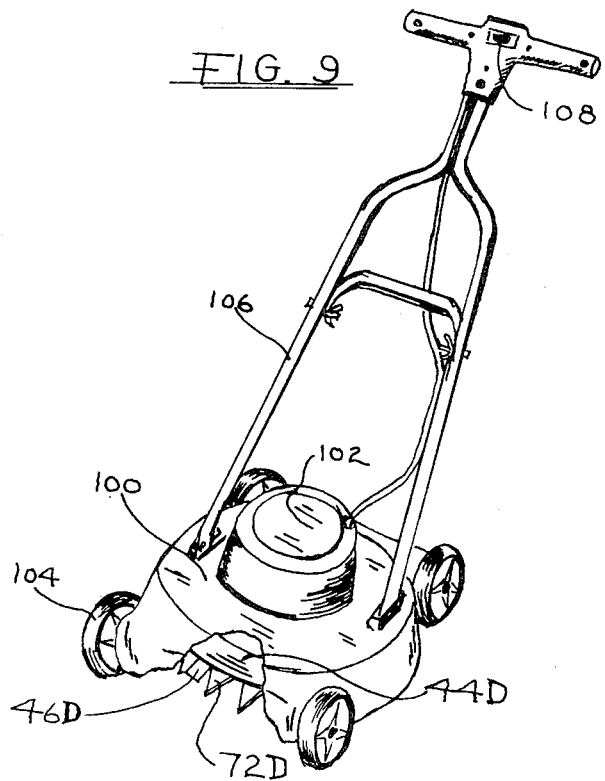

ROTARY SHEAR WITH IMPROVED CUTTING ASSEMBLY

This application is a continuation-in-part of my prior application Ser. No. 413,533 filed Nov. 7, 1975, now abandoned.

BACKGROUND AND SUMMARY OF THE INVENTION

The present invention is directed to an improved grass shear embodying a stationary toothed bed knife provided with cutting edges and a motor driven rotary blade cooperable therewith. The rotary blade member includes cutting edge means cooperatively engageable, in inclined scissor-like fashion, with the edges of the stationary bed knife teeth. The overall assembly is particularly adapted to be highly efficient, thus lending itself for use in a cordless, battery powered device. As used herein, the term "grass shear" describes a device intended to cut growth such as grass, weeds, shrubs and the like.

In my prior patent application, Ser. No. 413,533, filed Nov. 7, 1973, a similar grass shear is disclosed. This application is a continuation-in-part of the prior application which is incorporated by reference hereto in full. The grass shear disclosed, in my prior application, Ser. No. 413,533, in a preferred embodiment, includes a plurality of independent blade members carried by a motor driven hub assembly and resiliently biased in an axial direction by a spring towards a stationary toothed blade. The rotary blade members cooperate with the stationary teeth to produce scissor-like cutting action while permitting each blade to lift and slide over each stationary tooth independently of one another.

In accord with the present invention, the preferred embodiment consists of a rotating cutting blade member underlying and partially within a recessed portion of a rotating circular hub drive member. The rotating cutting blade member is positioned about a shaft which protrudes up from the center of the circular stationary bed knife. The rotating cutting blade member is held in a floating relationship above the stationary bed knife by washers and an E ring clip affixed to said shaft and the fact that blade fingers which are a part of the rotating cutting blade member are inclined downwardly so that lateral leading cutting edges formed on these blade fingers are in scissor-like engagement with lateral cutting edges formed on the bed knife teeth. Scissorlike engagement may also be achieved by inclining the bed knife teeth upwardly or by a combination of a lesser bend in both elements.

The rotating cutting blade member, being made of relatively thin hardened steel, is able to flex in springlike fashion, and as it is not affixed to it's driving member it is able to rock in see-saw like fashion about it's central axis as it rises while cutting on one tooth of the bed knife while at the same time the cutting edge formed on the opposite finger of the rotating cutting blade member is falling off of a trailing edge of a tooth on the opposite side of the stationary bed knife. Although, in the preferred embodiment, the rotating cutting blade flexes and thus provides it's own spring tension, separate spring means may be used and the rotating cutting blade may be of any desired thickness. For example, in such a configuration, the washers and the E ring clip which position the rotating cutting blade about the bed knife shaft may be eliminated and spring pressure applied upon a flat circular portion of the rotating cutting blade from above.

In the preferred embodiment the rotating cutting blade member consists of a flat central portion with a hole in it's center. Two blade fingers extend from this circular central portion, these fingers being substantially diametrically opposite to each other such as at a 12 o'clock and 6 o'clock position. At a 3 o'clock and a 9 o'clock position about this flat circular portion drive tabs protrude from the rotary cutting blade member and are bent 90 degrees upwards. These tabs fit into holes in the rotating hub drive member which will thus also rotate the cutting blade member. The two extending blade fingers are bowed downwardly, their lateral leading cutting edges are sharpened and the blade fingers are twisted about their longitudinal axes lowering the sharpened cutting edges below the rest of the body of the blade fingers. This blade configuration permits only the lateral leading cutting edges of the rotating cutting blade member to contact the surface of the bed knife making contact with the bed knife teeth while rising along the lateral cutting edges of the bed knife teeth and subsequently falling off of the lateral trailing edges of these teeth. The flat central portion of the cutting blade, as it is forced by the spring pressure imparted by the bowed cutting blade fingers into contact with the flat washer above it, stabilizes the rotating cutting blade member so that the cutting edges of the bowed twisted blade fingers maintain a proper shearing attitude.

The bed knife of this improved rotary shear is also specific in it's configuration. In the preferred embodiment there are eleven projecting teeth evenly spaced about the periphery of the bed knife. An odd number of identically shaped pointed toothed projections evenly spaced about 360 degrees of the circumference of the bed knife will result in the tip of any given tooth and a straight line projected from that tip across the center of the circular bed knife to a point diametrically opposite on the circumference encompassing the tips of the toothed projections will put that point equidistance between the tips of the toothed projections on either side of that point. It is also possible to use an even number of evenly spaced identical teeth in which case the preferred shape of the rotary cutting blade must be altered to achieve the desired rocking cutting action.

In the preferred embodiment the flat bed knife is four inches in overall diameter and the toothed projections are seven-eights of an inch long. The number of degrees in the angle of a lateral cutting edge of a bed knife tooth from a line drawn from it's tip to the center of the bed knife is determined solely by preference and need not be equal to the angle from said line formed by the lateral trailing edge of the triangular tooth. In the preferred embodiment, for optimum performance, the aforementioned angles are such, in combination with the shape of the rotary cutting blade member, that at the moment that one lateral leading cutting edge of a rotating blade finger starts it's cut at the inner portion of the lateral cutting edge of a given bed knife tooth, the lateral leading cutting edge on the opposite blade finger of the rotating cutting blade member is just beginning to fall off the trailing edge of a tooth on the other side of the bed knife. This opposite cutting edge continues to fall off the lateral trailing edge of this tooth as the lateral leading cutting edge of the blade finger actually shearing is rising along the lateral cutting edge of the bed knife tooth it is in contact with. At the completion of this cut the opposite blade finger has just completed falling off of the trailing edge of the bed knife tooth with which it is in contact. This action repeats itself 22 times upon the 11 bed knife teeth of the preferred embodiment in the 360 degrees of rotation of the cutting blade member and the result is a rocking see-saw like cutting motion for highly efficient and energy conserving cutting action.

In accord with a further specific improvement the diameter of the rotary hub drive member is such that the periphery of the rotary hub drive member overlaps a portion of the toothed projections of the bed knife. This configuration assures that all grass and the like entering into the spaces between the bed knife teeth is within the cutting area of the grass shear and there are no exposed surfaces of the bed knife where grass and the like can accumulate and affect the efficiency of the tool.

It is also a specific function of the rotary hub drive member to prohibit grass and the like from entering into the housing of the grass shear and, of equal importance, a portion of the undersurface of the rotary hub rides in juxtaposition and parellel to the flat upper surface of the bed knife thus preventing grass and other growth from entering the area beetweem these two surfaces and inhibiting the rotary motion of the grass shear.

It is accordingly an object of the present invention to provide a new and improved grass shear utilizing a stationary bed knife, a rotary hub drive member and a rotary cutting blade assembly.

It is a further object of the present invention to provide an improved grass shear having a stationary bed knife and a rotary blade assembly and wherein improved cutting action is achieved by means of specific improvements affecting the cooperation between the rotary cutting edges and the teeth of the stationary bed knife.

A further object of this invention is the provision of an improved grass shear wherein loading of the energy source for the shear is minimized by the blade action and the cooperation of the rotary hub drive member and the bed knife.

Further important objects of the present invention are the provision of an improved grass shear assembly which embodies relatively low manufacturing and maintenance costs and yet is characterized by efficient operation and long life.

Additional objects of the present invention will become apparent from a consideration of the detailed description taken in conjunction with the attached drawings.

THE DRAWINGS

FIG. 1A is a perspective view showing a grass shear embodying the present invention.

FIG. 1B is a perspective view of a portion of FIG. 1A illustrating a separation of the shear head from the power handle.

FIG. 2 is an enlarged sectional view of the gear train, the rotary hub drive member and the cutting assembly shown in FIG. 1A.

FIG. 3 is an exploded view showing the parts of the rotary hub drive member and the cutting assembly of the embodiment illustrated in FIG. 2.

FIG. 7 is an enlarged sectional view of FIG. 4 taken along lines 7—7 thereof.

FIG. 8 is an enlarged sectional view of FIG. 4 take along lines 8—8 thereof.

FIG. 9 is a partially sectional perspective view of a lawn mower embodying the present invention.

DETAILED DESCRIPTION

Figure 4:
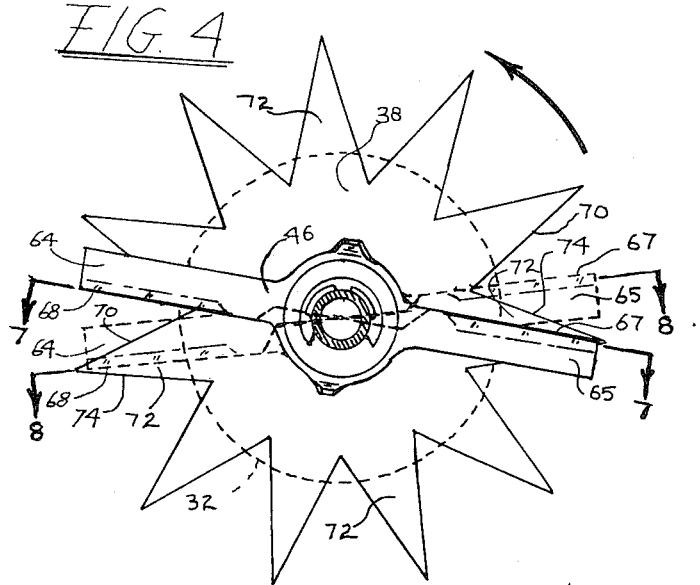
FIG. 4 is a sectional view taken along lines 4—4 in FIG. 2 and showing the cutting assembly in alternative positions.

A portable electric grass shear embodying the present invention is illustrated generally at 10 in FIG. 1A. The shear includes a housing having a motor enclosing portion 14 and a handle portion 16. The present invention lends itself particularly for use as a cordless device in which case the handle portion 16 includes a battery storage portion 18. An electric motor 20, shown in FIG. 2, is adapted to be controlled by an on-off trigger switch 22, the operation of which is preferably limited by the provision of a safety lock member 24. At the rear of the handle portion 16, an electrical jack 25, hidden from view in the perspective, is included for recharging the batteries in compartment 18.

FIG. 1B illustrates an optional provision for disconnecting the shear and motor portion 12 from the handle portion 16. A tongue 11 and a groove 13 slide within each other and a male electrical jack 15 mates with a female electrical jack 17 to supply power to electric motor 20. This optional feature makes it possible to add an extension wand between the shear and motor portion 12 and the handle portion 16 so that the tool may be used by it's operator while standing fully erect. This optional feature further allows for the handle portion 16 to be used with other tools such as connected to a shrub trimmer or a power drill.

In FIG. 2 the motor 20 is supported within the housing 14 and includes an output shaft 26 having a drive pinion 28 affixed thereto. The pinion drives a large spur gear 30 which is affixed to rotary hub member 32 by means of screws 34. Rotary hub drive member 32 rotates about stationary hollow shaft 36 which is affixed to stationary bed knife 38. The stationary hollow shaft and the bed knife assembly is in turn firmly held about shaft 40, which is affixed to housing 14, by nut 42. When trigger switch 22 is operated, the lock having been released, motor 20 causes rotation of shaft 26 and pinion 28 due to the application of power from batteries or other appropriate sources of energy, which in turn causes the rotation of spur gear 30 and rotary hub drive member 32.

FIG. 2 further illustrates the relationship of rotary hub drive member 32 and housing 14. The rotary hub drive member 32, being circular on it's periphery nests within and in close proximity to the circular drive train enclosing portion 44 of housing 14 this relationship preventing grass and other growth from entering into this enclosure and effecting the shear's operation.

The assembly of the unit can best be seen in FIG. 3. Stationary hollow shaft 36 is affixed to and protrudes up through a hole in the center of bed knife 38. Rotary blade 46 fits about hollow shaft 36 and is held into contact with the teeth of the bed knife by TEFLON washer 48, metal washer 50 and E ring clip 52. E ring clip 52 is affixed about hollow shaft 36 by insertion into groove 54 of hollow shaft 36. When this assembly is completed rotary blade member 46 is having exerted upon it by TEFLON washer 48 the required amount of downward pressure so that the desired shearing action, which will be described in detail later, is achieved.

Rotary hub drive member 32 is placed about stationary hollow shaft 36 over the completed blade assembly. The portion of rotary hub drive member 32 indicated at 56 rests and rotates upon E ring 52. Rotary hub drive member 32 is so dimensioned that it's undersurface at 58 is being held close to but not in contact with and in a plane parallel to the flat upper surfaceof bed knife 38 by it's surface of about hollow shaft 36 and the contact of it's surface at 56 with E ring 52. The close proximity of undersurface 58 with the flat upper surface of bed knife 38 is an important feature of this invention as this close relationship prevents grass and other growth from entering into this space and clogging the shear or slowing it's operation.

When the unit is assembled rotary hub drive member 32 cooperates with rotary blade member 46. Rotary blade tabs 60 fit into holes 62, only one of which is shown the other being hidden from view in the perspective, of the rotary hub drive member thus it's rotation causes blade 46 to rotate. Rotary blade fingers 64 and 65 protrude out from within the rotary hub drive member through slots 66. The sharpened lateral leading cutting edges 67 and 68 of the blade fingers cooperate, in inclined scissor-like engagement, with the lateral cutting edges 70 of the bed knife teeth 72. The assembly illustrated in FIG. 3 is completed by inserting shaft 40 through hollow shaft 36 and affixing nut 42 thereto.

FIG. 3 illustrates further features of this invention. The circular portion 61 of rotary blade member 46 is flat however the blade fingers 64,65 are bowed downwardly and furthermore the blade fingers are twisted about their longitudinal axes further inclining downwardly the sharpened lateral leading cutting edges 67 and 68. As blade member 46 is not affixed to rotary hub drive member 32 it is in a free floating position above the surface of bed knife 38 and because of the bowed and twisted configuration of the blade fingers only the lateral leading cutting edges 67 and 68 come into contact with bed knife teeth 72. The points of contact between cutting edges 67,68 are further directed by the blade finger's configuration to the lateral cutting edges 70 and the lateral trailing edges 74 of the bed knife. As will be seen hereinafter the points of contact relationship described have a direct bearing upon the cutting action of the shear.

Because of the bow and twist in the blade fingers 64 and 65 and the resultant sliding single point of contact along each edge 67,68 and a corresponding point along the edges 70, 74 of the bed knife teeth, it is an important feature of this invention that rotary blade member 46 is stabilized by it's flat circular portion 61 which rotates about a plane substantially parellel with the flat upper surface of bed knife 38. This substantially parallel plane is maintained by a flat circular portion 61 being pressed upon by TEFLON washer 48, a metal washer 50 and E ring clip 52, the surfaces of which are substantially parellel to the surface of the bed knife. The rotary blade being stabilized as described assures that the lateral leading cutting edges of the blade fingers properly contact the lateral cutting and trailing edges of the bed knife teeth.

FIG. 4 is a view looking down onto the top of the rotary cutting blade assembly and the stationary toothed bed knife element shown in FIG. 3 with hollow shaft 36 shown in cross section. FIG. 4 illustrates another specific feature of this invention. As illustrated by the position of blade element 46, as shown in full lines, the lateral leading cutting edge 68 of blade finger 64 is just beginning a cutting action on tooth edge 70 while lateral leading cutting edge 67 of opposite blade finger 65 is just starting to fall off trailing edge 74 of bed knife tooth 72. After a small further rotation of blade 46 to the position illustrated in dotted lines the cutting edge 68 of blade finger 64 is now just beginning to fall off trailing edge 74 of bed knife tooth 72 while cutting edge 67 of blade finger 65 is just beginning a cutting action on tooth edge 70 of the next adjacent bed knife tooth. The eleven toothed projections 72 of the bed knife that when one moving lateral leading cutting edge e.g. 68 is traversing a given lateral cutting edge 70 the other lateral leading cutting edge 67 is traversing a lateral trailing edge 74.

The alternate cutting action just described combined with the floating position of rotary blade 46 above bed knife 38 permits a rocking see-saw like action of the rotary blade member to occur. This rocking action combines with a limited flexing action of blade fingers 64 and 65 to provide a smooth, uniform and highly efficient shearing action with a minimal expenditure of energy being required of the shear's power source.

In FIG. 7 and FIG. 8, enlarged sectional views taken along lines 7—7 and 8—8 of FIG. 4, the rocking action just described is clearly illustrated. In FIG. 7 blade edge 68 is down between two of the stationary teeth 72 and just beginning a cutting action upon a stationary tooth edge not shown. In FIG. 8 blade edge 68 is up and just beginning to fall off the trailing edge of tooth 72. Correspondingly, blade edge 67 is up in FIG. 7 and down in FIG. 8. The positions of blade tab 60, somewhat exaggerated, also show the occuring rocking motion. FIGS. 7 and 8 further illustrate the downward inclination and the twisting of the blade fingers.

Still another specific feature of this invention is illustrated in FIG. 4. The circular dotted line illustrates the position of the perphery of rotary hub drive member 32 in relation to bed knife 38 and more particularly in relation to the V formed at the juncture of cutting edges 70 and trailing edges 74 of the bed knife teeth. As can be seen the periphery of hub 32 extends out and over the inner portion of the lateral cutting edges of these teeth. It is thus apparent that grass and the like which is being cut is kept away from the flat upper surface of the bed knife from which the toothed projectons 72 emanate and as such the likelihood of cut grass and the like accumulating or entering into the space between the flat surface of the bed knife 38 and the undersurface 58 of the rotary hub drive member 32 is further minimized.

The extension of the periphery of the rotary hub 32 out and over the inner portion of the lateral cutting and trailing edges of the bed knife teeth has an additional further function. In a preferred embodiment this grass shear is battery powered and it is imperative that the drain on the power source be kept at a minimum, as such it is critical that the downward pressure which blade finger edges 67 and 68 exert upon cutting and trailing edges 70 and 74 of the bed knife is carefully controlled in manufacture. The distance along the cutting and trailing edges 70 and 74 which is covered by the undersurface 58 of the rotary hub drive member allows for a small degree of latitude in tolerance control as the downward cutting pressure in this area may be on the minus side of what is deemed sufficient without adversly affecting the efficiency of this invention.

Figure 5:
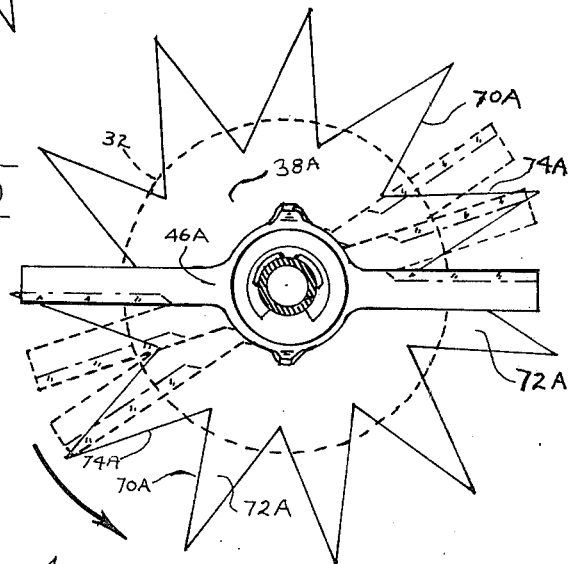
FIGS. 5 and 6 are views corresponding to that of FIG. 4 but illustrating alternate embodiments of this invention.
Figure 6:
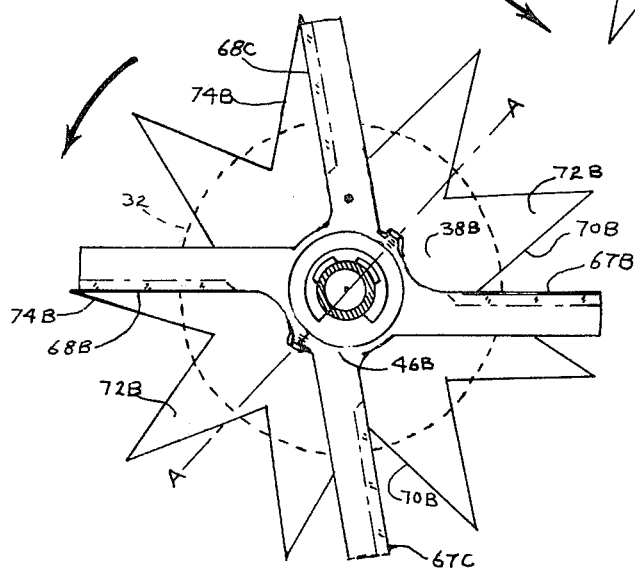

FIGS. 5 and 6 illustrate alternate constructions in accord with the teachings of this invention. In particular, FIG. 5 illustrates a construction which is basically similar to FIG. 4 except that it shows that the angles of the lateral cutting edges 70A and the lateral trailing edges 74A of the bed knife teeth 72A, taken along a line running from the tip of tooth 72A to the center of the bed knife 38A may be varied and need not be equal as long as the lateral leading cutting edges of rotary blade member 46A are adjusted to the change in angle.

FIG. 6 illustrates an embodiment which has a lesser number of bed knife teeth, namely 9. This number of teeth could readily be accepted to function with the rotary blade members illustrated in FIGS. 4 and 5, nonetheless in FIG. 6 rotary blade 46B has a plurality of blade fingers exceeding 2. The rocking action previously described occurs about axis A-A and in the position illustrated blade finger edges 68B and 68C are traversing lateral trailing edges 74B while blade finger edges 67B and 67C are traversing lateral cutting edges 70B. It can be invisioned that with further rotation the above action will revert to the opposite side of axis A-A and a rocking see-saw like action of the rotary blade member 46B, as has been previously described, will repeat itself about 360 degrees of rotation.

FIG. 9 illustrates an embodiment of this invention in which bed knife teeth 72D, rotary blade member 46D and the circular drive train enclosure 44D are shown beneath the frame 100 of a lawn mower. The remaining parts of the construction in accord with the teachings of this invention are hidden from view in the perspective illustration. The lawn mower frame 100 has a motor enclosing portion 102, wheels 104 and a handle 106. Electric current, preferably from a battery enclosed within portion 102, activates the motor within portion 102 which in turn causes the rotation of blade 46D. When switch 108 is turned on teeth 72D, being in a spaced relationship above the lawn will cooperate with the cutting edges of rotary blade 46D to shear grass and the like as the lawn mower is guided forwardly or rearwardly above the ground. A lawn mower, such as illustrated in FIG. 9, may be constructed with one or more motors affixed thereto operating a plurality of rotary shear cutting assemblies affixed to the lawn mower frame in adjacent specifically spaced relationships to shear a path of grass as these cutting units are being guided above the lawn.

The above discription has included several different embodiments of the present invention. Devices of these various types, as well as devices embodying the concept of the invention, but including such changes and modifications as will be obvious to those skilled in the art will exhibit significant improvement in performance in comparism to prior art devices of this type. Accordingly, it is intended that the appended claims cover all such changes and modifications as may fall within the true spirit and scope of this invention.

I claim:

1. A rotary grass shear comprising in combination:
   A. A housing having an electric motor therein, said electric motor having an output rotary shaft,
   B. a stationary bed knife secured to said housing, said stationary bed knife having a plurality of substantially radially extending teeth each of which has a lateral cutting edge and a lateral trailing edge formed thereon,
   C. a rotary hub drive member and a rotary blade driven by said rotary hub drive member, said rotary blade being free from fixed attachment to said rotary hub drive member,
   D. a stationary shaft about which said rotary hub drive member and said rotary blade are rotatably mounted,
   E. a plurality of blade fingers with lateral leading cutting edges formed thereon, said blade fingers being part of said rotary blade, said rotary blade including said blade fingers being so formed that each blade finger is inclined downwardly such that said blade fingers engage said lateral cutting edges of the substantially radially extending teeth and such that said blade fingers rise up and away from the substantially radially extending teeth as the cutting action traverses slidably along the lateral cutting edges of the substantially radially extending teeth of said bed knife towards outer tips of the substantially radially extending teeth,
   F. a positioning assembly located about said stationary shaft spaced from and maintaining said rotary blade in a floating relationship between said positioning assembly and said bed knife, said positioning assembly allowing said rotary blade to rock up and down in see-saw like fashion about said stationary shaft during rotation and said positioning assembly holding said lateral leading cutting edges of said blade fingers at an inclined angle to the plane of the lateral cutting edges of the substantially radially extending teeth such as to be engageable of said lateral cutting edges of said substantially radially extending teeth thereby shearable of grass and other growth.

2. A rotary grass shear comprising in combination:
   A. A housing having an electric motor therein, said electric motor having an output rotary shaft,
   B. a stationary bed knife secured to said housing, said stationary bed knife having a plurality of substantially radially extending teeth each of which has a lateral cutting edge and a lateral trailing edge formed thereon,
   C. a rotary hub drive member and a rotary blade driven by said rotary hub drive member, said rotary blade being free from attachment to said rotary hub drive member,
   D. a stationary shaft about which said rotary hub drive member and said rotary blade are rotatably mounted,
   E. a plurality of blade fingers with lateral leading cutting edges formed thereon, said blade fingers being part of said rotary blade, said rotary blade including said blade fingers and said substantially radially extending teeth of the bed knife being so formed that said blade fingers engage said lateral cutting edges of the substantially radially extending teeth of the bed knife at an inclined angle to each other and such that said blade fingers rise up and away from the substantially radially extending teeth of the bed knife as the cutting action traverses slidably along the lateral cutting edges of the substantially radially extending teeth of said bed knife towards outer tips of said substantially radially extending teeth,
   F. a positioning assembly located about said stationary shaft spaced from and maintaining said rotary blade in a floating relationship between said positioning assembly and said bed knife, said positioning assembly allowing said rotary blade to rock up and down in see-saw like fashion about said stationary shaft during rotation and said positioning assembly holding said lateral leading cutting edges of said blade fingers and the lateral cutting edges of the substantially radially extending teeth of the bed knife at an inclined angle to each other such as to engage said lateral leading cutting edges of said blade fingers and said lateral cutting edges of said substantially radially extending teeth thereby shearable of grass and other growth.

3. A rotary grass shear according to claim 2 wherein said substantially radially extending teeth and said lateral cutting edges formed thereon are positioned in predetermined locations about a circumference of said bed knife and wherein the cutting action between the lateral leading cutting edges formed on the blade fingers and the lateral cutting edges formed on the substantially radially extending teeth of the bed knife on one side of a longitudinal central axis of said stationary shaft about which said rotary blade is rockable is substantially completed before like cutting action occurs on an opposite side of said longitudinal central axis of the stationary shaft, this action being repeatable back and forth from one side of said longitudinal central axis to the other side of said longitudinal central axis throughout 360° of rotation.

4. A rotary grass shear according to claim 2, wherein said blade fingers are also twisted about their respective longitudinal axes positioning said lateral leading cutting edges formed on said blade fingers such that said lateral leading cutting edges are the only parts of said rotary blades that contact said bed knife and said substantially radially extending teeth and wherein a portion of said rotary blade adjacent to a central longitudinal axis of said stationary shaft is flat, resting against said positioning assembly along a plane substantially parellel to a surface of said bed knife in juxtaposition thereto so that said rotary blade and said blade fingers are stabilized about their respective longitudinal axes assuring that said lateral leading cutting edges of said blade fingers are held in resiliently inclined scissor-like engagement with said lateral cutting edges of said substantially radially extending teeth of said bed knife.

5. A rotary grass shear according to claim 2, wherein said substantially radially extending teeth and said lateral cutting edges and said lateral trailing edges formed thereon are positioned in predetermined locations about a circumference of said bed knife and wherein the cutting action between the lateral leading cutting edges formed on the blade fingers and the lateral cutting edges formed on the substantially radially extending teeth of the bed knife on one side of a longitudinal central axis of said stationary shaft about which said rotary blade is rockable is occurable substantially coincident with the lateral leading cutting edges of the blade fingers on the opposite side of said longitudinal central axis of the stationary shaft being traversably slidable along said lateral trailing edges of the substantially radially extending teeth of the bed knife this coincident action being repeatable back and forth from one side of said longitudinal axis to the other side of said longitudinal axis throughout 360° of rotation.

6. A rotary grass shear according to claim 2, wherein said substantially radially extending teeth and said lateral cutting edges and said lateral trailing edges formed thereon are positioned in predetermined locations about a circumference of said bed knife and wherein the cutting action between a lateral leading cutting edge formed on a blade finger and a lateral cutting edge formed on a substantially radially extending tooth of the bed knife on one side of a longitudinal central axis of said stationary shaft about which said rotary blade is rockable is occurable substantially coincident with a lateral leading cutting edge of a blade finger on the opposite side of said longitudinal central axis of the stationary shaft being traversably slidable along a lateral trailing edge of a substantially radially extending tooth of the bed knife this coincident action being repeatable back and forth from one side of said longitudinal axis to the other side of said longitudinal axis throughout 360° of rotation.

7. A rotary grass shear according to claim 2 including a lawn mower frame with wheels operatively mounted thereon and a handle mounted on the lawn mower frame for guiding said lawn mower frame along the ground on said wheels, said housing being affixed to said lawn mower frame.

8. A rotary grass shear comprising a housing having an electric motor therein, said electric motor having an output rotary shaft, a stationary bed knife assembly secured to said housing, said stationary bed knife assembly including a stationary bed knife having a plurality of substantially radially extending teeth each of which has a lateral cutting edge and a lateral trailing edge formed thereon, a stationary shaft about which a rotary blade means driven by said electric motor is rotatable, said rotary blade means being in a floating relationship to said bed knife adapted such that the rotary blade means is able to rock in see-saw like fashion about said stationary shaft, said rotary blade means having finger means with lateral leading cutting edges formed thereon which are adapted to be contactable consecutively in a predetermined relationship with the lateral cutting edges and the lateral trailing edges to engage said lateral cutting edges at an inclined angle to a plane along which said lateral cutting edges extend to be shearable of grass and other growth in scissor-like fashion.

9. A rotary grass shear according to claim 8 including a lawn mower frame with wheels operatively mounted thereon and a handle mounted on the lawn mower frame for guiding said lawn mower frame along the ground on said wheels, said housing being affixed to said lawn mower frame.

10. A rotary grass shear comprising in combination:
A. A housing having an electric motor therein, said electric motor having an output rotary shaft,
B. a stationary bed knife secured to said housing said stationary bed knife having a plurality of substantially radially extending teeth, each of which has a lateral cutting edge and a lateral trailing edge formed thereon,
C. a rotary hub drive member and a rotary blade member driven by said rotary hub drive member, said rotary blade member being free from fixed attachment to said rotary hub drive member, a portion of said rotary blade member recessed within said rotary hub drive member, said rotary hub drive member having a portion of a radially outwardly located undersurface rotatable in a plane substantially parallel to and in juxtaposition to and spaced from a substantially horizontal surface of said stationary bed knife and wherein the radius of said rotary hub drive member is a predetermined amount larger than the distance from the center of the stationary bed knife to the points located where said lateral cutting edges formed on said substantially radially extending teeth emanate out from the body of the bed knife, D. a stationary shaft, located at the center of said bed knife, about which said rotary hub drive member and said rotary blade member are rotatably mounted, E. two blade fingers, each with a lateral leading cutting edge extending along a longitudinal axis of the blade finger, said blade fingers being a part of said rotary blade member and located substantially diametrically opposite to each other, said rotary blade member including said blade fingers being so formed that said blade fingers are inclined downwardly and twisted about said longitudinal axis thereby lowering the lateral leading cutting edge of the blade finger into a cooperable cutting attitude with the lateral cutting edges of the substantially radially extending teeth and into sliding contact between and along the lateral leading cutting edges of the blade fingers and consecutively the lateral cutting edges and the lateral trailing edges of said substantially radially extending teeth, F. a positioning assembly located about said stationary shaft spaced from and maintaining said rotary blade member in a floating relationship between said positioning assembly and said stationary bed knife, said rotary blade member and said positioning assembly being so constructed as to allow said rotary blade member to rock in see-saw like fashion about said stationary shaft, the lateral leading cutting edges of said blade fingers being engagable consecutively of the lateral cutting edges and the lateral trailing edges of the substantially radially extending teeth of the stationary bed knife in a predetermined manner wherein when the lateral leading cutting edge of one blade finger is traversable of a lateral cutting edge of one of said substantially radially extending teeth, the substantially diametrically opposite blade finger and the lateral leading cutting edge thereof is traversable slidably along said lateral trailing edge of the substantially radially extending tooth on the opposite side of the stationary bed knife, repeatably back and forth from one side of said stationary shaft to the other side of said stationary shaft throughout 360 degrees of rotation of the rotary blade member.

11. A rotary grass shear comprising in combination: a housing having an electric motor therein, said electric motor having an output rotary shaft; a stationary bed knife assembly secured to said housing, said stationary bed knife assembly having a plurality of substantially radially extending teeth each of which has a lateral cutting edge formed thereon; a rotary blade means for shearing of grass and other growth by rotary blade action, said rotary blade means including a cutting edge means formed thereon for cutting as a leading edge as a rotary blade is rotated, and said rotary blade means being driven by said electric motor, said cutting edge means being coactable with the lateral cutting edges of the substantially radially extending teeth of the bed knife assembly; a shaft, located at a center of said bed knife assembly about which said rotary blade means is rotatable; a rotary hub rotatable with said rotary blade means and adapted such that a portion of said rotary blade means is recessed within said rotary hub, a periphery of said rotary hub being in juxtaposition to and spaced from said housing, a portion of an undersurface of the rotary hub about a radially outer periphery thereof being rotatable in a plane substantially parallel to and in juxtaposition to and spaced from a substantially horizontal surface of said stationary bed knife assembly and adapted such that the radius of said rotary hub is a predetermined amount larger than the distance from the center of the stationary bed knife assembly to the points located where said lateral cutting edges of said substantially radially extending teeth emanate out from the body of the bed knife assembly.

* * * * *